(12) United States Patent
Yang et al.

(10) Patent No.: US 8,922,779 B2
(45) Date of Patent: Dec. 30, 2014

(54) DIGITAL SIGNAL PROCESSING METHOD AND DEVICE OF FIBER-OPTIC GYROSCOPE, AND FIBER-OPTIC GYROSCOPE

(71) Applicant: Peking University, Beijing (CN)

(72) Inventors: Chuanchuan Yang, Beijing (CN); Qin Wang, Beijing (CN); Ziyu Wang, Beijing (CN)

(73) Assignee: Peking University, Beijing (CN)

( * ) Notice: Subject to any disclaimer, the term of this patent is extended or adjusted under 35 U.S.C. 154(b) by 262 days.

(21) Appl. No.: 13/663,664

(22) Filed: Oct. 30, 2012

(65) Prior Publication Data

US 2013/0135623 A1 May 30, 2013

(30) Foreign Application Priority Data

Nov. 28, 2011 (CN) .......................... 2011 1 0385420

(51) Int. Cl.
*G01C 19/72* (2006.01)
(52) U.S. Cl.
USPC ....................................................... 356/463
(58) Field of Classification Search
CPC ......... G01C 19/64; G01C 19/72; G01C 19/66
USPC .................................................. 356/463, 460
See application file for complete search history.

(56) References Cited

U.S. PATENT DOCUMENTS

| | | | | |
|---|---|---|---|---|
| 5,283,625 A | * | 2/1994 | Bunn, Jr. | 356/463 |
| 5,289,257 A | | 2/1994 | Kurokawa et al. | |
| 5,444,533 A | * | 8/1995 | Nishiura et al. | 356/460 |
| 6,429,939 B1 | | 8/2002 | Bennett et al. | |
| 8,085,407 B2 | * | 12/2011 | Qiu et al. | 356/461 |
| 2002/0150235 A1 | | 10/2002 | Georgiev | |

FOREIGN PATENT DOCUMENTS

CN 101187559 5/2008

* cited by examiner

*Primary Examiner* — Jonathan Hansen
(74) *Attorney, Agent, or Firm* — Perkins Coie LLP

(57) ABSTRACT

The present invention provides a signal processing method and device for the fiber-optic gyroscope, which can effectively expand the dynamic range of the fiber-optic gyroscope, improve the linearity of the scaling factor, and restrain the zero drift of the open-loop fiber-optic gyroscope, i.e., the dynamic fluctuation of the scaling factor. The fiber-optic gyroscope proposed by the present invention provides a first harmonic demodulation reference signal and a second harmonic demodulation reference signal, which are high in quality and synchronous in detection signal, to the signal processing device proposed by the present invention by the digital phase-locked loop technology.

17 Claims, 8 Drawing Sheets

| Range of Micromechanical Gyroscope Output Value | Quadrant Interval M of Sagnac Phase Shift When Gyroscope Starts |
|---|---|
| ... | ... |
| 6 Ω' ~ 10 Ω' | 2 |
| 2 Ω' ~ 6 Ω' | 1 |
| -2 Ω' ~ 2 Ω' | 0 |
| -6 Ω' ~ -2 Ω' | -1 |
| -10 Ω' ~ -6 Ω' | -2 |
| ... | ... |

*FIG. 8*

DIGITAL SIGNAL PROCESSING METHOD AND DEVICE OF FIBER-OPTIC GYROSCOPE, AND FIBER-OPTIC GYROSCOPE

CROSS REFERENCE TO RELATED APPLICATIONS

This application claims priority to Chinese Patent Application No. 201110385420.2, which was filed on Nov. 28, 2011, entitled "DIGITAL SIGNAL PROCESSING METHOD AND DEVICE OF FIBER-OPTIC GYROSCOPE, AND FIBER-OPTIC GYROSCOPE" which is hereby incorporated by reference in its entirety.

FIELD OF THE INVENTION

The present invention relates to the field of fiber-optic sensing; in particular, it relates to a digital signal processing method and device, which can expand the dynamic range of a fiber-optic gyroscope and a fiber-optic gyroscope based on the device.

DESCRIPTION OF THE RELATED ART

The fiber-optic sensing technology is a novel sensing technology which takes a light wave as a carrier and fiber-optic as a medium to sense and transmit an external measured signal, thereby being widely concerned all the time. A fiber-optic gyroscope is one of the most important achievements in the field of fiber-optic sensing and is wide in application and development prospects within fields such as aviation, aerospace, navigation, geology, oil exploration, and the like. The fiber-optic gyroscope is an angular velocity measuring instrument based on the Sagnac effect, and an interferometric fiber-optic gyroscope has two basic structures: an open-loop structure and a closed-loop structure.

An open-loop fiber-optic gyroscope directly detects the Sagnac phase shift in a light path so that a working point of a system changes along with an input angular velocity; and a closed-loop fiber-optic gyroscope forms into a feedback loop by optical waveguide to offset the Sagnac phase shift in the light path, and a feedback signal is taken as a detection signal so that the working point of the system does not change along with the input angular velocity. Based on the working principle, the two fiber-optic gyroscopes have advantages and the disadvantages respectively: by contrast, the closed-loop fiber-optic gyroscope has the outstanding advantages of being higher in scale factor stability, wider in dynamic range, and smaller in shift; and the open-loop fiber-optic gyroscope is better in thermal shock resistance, mechanical shock resistance, mechanical vibration resistance, and electromagnetic interference resistance as well as higher in reliability and lower in production cost, use cost, and maintenance cost since the optical waveguide is not used for forming into the feedback loop.

The basic structure schematic diagram of the light path part of the open-loop fiber-optic gyroscope is shown in FIG. 1, and a detection signal output by a module 7 detector is as follows:

$$I_D(t) = I_O\{1 + \cos[\phi_s + \Delta\phi(t)]\} \quad (1)$$

wherein $\phi_s$ is Sagnac phase shift, $I_O$ is the mean power of the detection signal, and $\Delta\phi(t)$ is determined by an output signal of a module 6 phase modulator. The detection signal comprises a baseband signal of a phase modulating signal and each harmonic signal. The conventional open-loop fiber-optic gyroscope detects the first harmonic of $I_D(t)$, i.e., an output signal is as follows:

$$I_{out}(t) \propto I_0 \sin \phi_s \quad (2)$$

It can be seen from formula (2) that:

1) The performance of the conventional open-loop fiber-optic gyroscope has a very close relationship with the scaling factor. Key factors for influencing the scaling factor are as follows: a) signal amplitude output by the detector; and b) modulation depth of the phase modulator. Compared with the closed-loop fiber-optic gyroscope, the conventional open-loop fiber-optic gyroscope has the disadvantage that the stability of the scaling factor is easily influenced by the two factors.

2) Compared with the closed-loop fiber-optic gyroscope, the conventional open-loop fiber-optic gyroscope is smaller in dynamic range. It can be seen from formula (2) that the maximum dynamic range of the conventional open-loop fiber-optic gyroscope is a single-value interval $[-\pi/2, \pi/2]$ of a sin function. The relational expression between the fiber-optic gyroscope Sagnac phase shift $\phi_s$ and the system rotation angular velocity $\Omega$ is as follows:

$$\varphi_s = \frac{4\pi RL}{\bar{\lambda} c} \Omega \quad (3)$$

wherein $\bar{\lambda}$ is the mean wavelength of a module 1 light source, c is a the transmission speed in vacuum, R is the semidiameter of a module 5 fiber-optic coil, and L is the length of the fiber-optic coil. After (3) is brought into (2), it can be seen from that, under the limit of the single-value interval of the sin function, the maximum dynamic range of the angular velocity $\Omega$ which can be measured by the open-loop fiber-optic gyroscope is $$\left[-\frac{\bar{\lambda} c}{8RL}, \frac{\bar{\lambda} c}{8RL}\right].$$

It can be seen from the analysis that the maximum dynamic range of the conventional open-loop fiber-optic gyroscope is in inverse proportion to the semidiameter and the length of the coil. In combination with the formula (3), the Sagnac phase shift caused by the rotation of the system will be reduced once the dynamic range of the conventional open-loop fiber-optic gyroscope is expanded, so the sensitivity and the precision of the gyroscope are reduced.

3) Under some special application occasions, the open-loop fiber-optic gyroscope needs starting under a high rotation speed, so it can be known from (2) that, when the rotation speed exceeds a single-value interval rotation speed during starting, the conventional open-loop fiber-optic gyroscope cannot correctly measure the current angular velocity.

Aimed at problem 1), in order to reduce the influence of the instability of the scaling factor to the performance of the open-loop fiber-optic gyroscope, U.S. Pat. No. 6,429,939 B1 provides a method which comprises the following steps: detecting a first harmonic signal, a second harmonic signal, and a fourth harmonic signal of $I_D(t)$ by a digital signal processor (DSP) arranged at the back end of a detector; stabilizing the modulation frequency and the modulation depth of a piezoelectric transition (PZT) phase modulator by the second harmonic signal and the fourth harmonic signal; and adopting a method which outputs a Sagnac phase shift measurement value by dividing the first harmonic signal by the second harmonic signal and calculating the arc tangent to eliminate the influence of the signal amplitude fluctuation output by the detector to the performance of the gyroscope. However, the method disclosed by U.S. Pat. No. 6,429,939 B1 can not solve the problem 2).

Aimed at problem 2), in order to expand the dynamic range of the open-loop fiber-optic gyroscope, China Patent Publication No. CN101187559 provides a method, comprising the following steps: performing phase modulation with different amplitudes on the fiber-optic gyroscope by a phase modulator, sampling a corresponding gyroscope output signal, and performing data processing and data combining on the output signal so as to achieve the aim of expanding the single-modulation interval range of the open-loop fiber-optic gyroscope. The China Patent Publication No. CN101187559 expands the single-modulation Sagnac phase shift interval which can be measured by the open-loop fiber-optic gyroscope by means of signal processing from $[-\pi/2 \pi/2)$ mentioned in the analysis to $[-23\pi/16\ 23\pi/16)$, i.e., by 23/8 times; however, the present invention has the key point that the phase modulator works at five modulation stages within one modulation period rather than working under the aforementioned normal status, and each stage has different fixed modulation amplitudes, so the modulation signal output by the phase modulator is high in precision requirement and more strict in modulation amplitude.

In order to solve problem 3), it not only has to solve problem 2), i.e., expand the measurement range of the fiber-optic gyroscope to be greater than the single-value interval, but it also has to make the fiber-optic gyroscope start at any angular velocity within the measurement range. U.S. Pat. No. 5,289,257 provides a digital signal processing method which comprises the following steps of recording the quadrant information of the angular velocities by a digital signal processor (DSP) and tracking the angular velocities by a certain algorithm so as to achieve the aim of expanding the measurement range. However, the algorithm requests the initial angular velocity to be within the signal-value interval, otherwise, the angular velocity information cannot be correctly tracked, and the aim of starting under high-speed rotation cannot be achieved.

SUMMARY

Aimed at the problems existing in prior art, the present invention aims at providing a digital signal processing method and device, which can expand the dynamic range of a fiber-optic gyroscope and lead the fiber-optic gyroscope to start under high-speed rotation, and the present invention further provides a novel fiber-optic gyroscope in combination with the method. The digital signal processing method and device of the fiber-optic gyroscope proposed by the present invention are applicable to the back end of an open-loop fiber-optic gyroscope detector. On the premise that the light path structure of the open-loop fiber-optic gyroscope is not changed, the dynamic range of the fiber-optic gyroscope can be greatly expanded, and the adverse influence of the instability of the scaling factor of the gyroscope to the performance of the open-loop fiber-optic gyroscope can be effectively reduced at the same time.

The signal processing method and device, which are proposed by the present invention and can expand the dynamic range of a fiber-optic gyroscope, can lead the dynamic range of the gyroscope not to be related with the size parameter of a coil any longer and can further improve the precision of the fiber-optic gyroscope and the linearity of the scaling factor.

Based on the method and the digital phase-locked loop technology, the present invention further provides a novel fiber-optic gyroscope which can have the advantages of both the open-loop fiber-optic gyroscope and the closed-loop fiber-optic gyroscope at the same time.

For the signal processing method and device, which can expand the dynamic range of the fiber-optic gyroscope, a first sampled harmonic demodulation signal of a detection signal $I_D(t)$ at the time of k is proportional to $\sin \phi_s(k)$, and a second sampled harmonic demodulation signal is proportional to $\cos \phi_s(k)$; the scaling factors of the first sampled harmonic demodulation signal and the second sampled harmonic demodulation signal are different from each other and can be respectively obtained by a rotary table calibration experiment, and a rotary table provides a reference rotation speed in the process of testing to be respectively compared with the first sampled harmonic demodulation signal and the second sampled harmonic demodulation signal so as to obtain the corresponding scaling factor. Dividing the first sampled harmonic demodulation signal and the second sampled harmonic demodulation signal by the tested corresponding scaling factor to be capable of obtaining:

$$S_1(k) = C \sin \phi_s(k)$$

$$S_2(k) = C \cos \phi_s(k) \quad (4)$$

wherein C represents a residual coefficient after dividing the first sampled harmonic demodulation signal and the second sampled harmonic demodulation signal by the scaling factor, and k=1, 2, . . . . At the initial stage of the method, i.e., k=1, a means of obtaining the Sagnac phase shift measurement value is shown as FIG. 3:

a) if the fiber-optic gyroscope does not start at a high speed, the Sagnac phase shift measurement value can be directly obtained as follows:

$$\varphi_s(1) = \arctan \frac{S_1(1)}{S_2(1)} \quad (5)$$

b) if the fiber-optic gyroscope starts at a high speed, a quadrant interval M at which the Sagnac phase shift is placed at the start time can be determined according to a micromechanical gyroscope, and the Sagnac phase shift initial value at the start time can be determined according to the first and second harmonic demodulation signal $S_1(1)$, $S_2(1)$ at the initial time.

The signal processing method and device, which are proposed by the present invention and can expand the dynamic range of the fiber-optic gyroscope, can be taken as a module to be directly applicable to the back end of the existing open-loop fiber-optic gyroscope detector.

Compared with prior art, the beneficial effects of the present invention are as follows:
On the basis that the structure and the component function of the open-loop fiber-optic gyroscope shown in FIG. 1 (a phase modulator still works under a normal state) are not changed, the Sagnac phase shift monotone interval corresponding to a system rotation angular velocity capable of being measured by the fiber-optic gyroscope can completely break through the monotone interval of $[-\pi/2 \pi/2)$ and can expand to each quadrant so that the dynamic range of the open-loop fiber-optic gyroscope reaches the level of the gyroscope with a closed-loop structure.

In the present invention, the dynamic range of the open-loop fiber-optic gyroscope is not related to the size parameter of the coil any longer, so the precision of the open-loop fiber-optic gyroscope and the linearity of the scaling factor can be further improved.

Any fiber-optic gyroscope which can detect the first harmonic signal and the second harmonic signal output by the detector can use the signal processing device which is proposed by the present invention and can expand the dynamic range of the fiber-optic gyroscope to improve the dynamic range of the fiber-optic gyroscope and restrain the random drift of the scaling factor. Therefore, the derived novel fiber-optic gyroscope can have the advantages of the conventional open-loop gyroscope and the closed-loop gyroscope at the same time.

The novel fiber-optic gyroscope proposed by the present invention provides the first harmonic demodulation reference signal and the second harmonic demodulation reference signals, which are high in quality and synchronous in the detection signal, to the proposed signal processing device which expands the dynamic range of the fiber-optic gyroscope by the digital phase-locked loop technology.

BRIEF DESCRIPTION OF THE DRAWINGS

FIG. 8 is an embodiment determining a quadrant interval at which the Sagnac phase shift initial value is placed when the fiber-optic gyroscope dynamically starts.

DETAILED DESCRIPTION

The technical solution of the present invention in one embodiment is as follows:
A digital signal processing method of a fiber-optic gyroscope is shown as FIG. 2, comprising:

1) respectively and dividing a first harmonic demodulation signal $S_1(k)$ and a second harmonic demodulation signal $S_2(k)$, which are output after an open-loop fiber-optic gyroscope samples at the time of k, into two signals, and respectively delaying one signal by N sampling period time, wherein k and N are respectively to be a natural number (k and N=1, 2, 3 . . . );

2) multiplying the delayed first harmonic demodulation signal $S_1(k)$ by the undelayed first harmonic demodulation signal $S_1(k)$ to obtain an output signal S0, and multiplying the delayed first harmonic demodulation signal $S_1(k)$ by the undelayed second harmonic demodulation signal $S_2(k)$ to obtain an output signal S3; and multiplying the delayed harmonic demodulation signal $S_2(k)$ by the undelayed first harmonic demodulation signal $S_1(k)$ to obtain an output signal S1, and multiplying the delayed second harmonic demodulation signal $S_2(k)$ by the undelayed second harmonic demodulation signal $S_2(k)$ to obtain an output signal S2;

3) subtracting the signal S3 from the signal S1 and dividing by the sum of the S0 and the S2 to obtain an output signal S; and 4) adding the low-pass filtered signal S to a Sagnac phase shift measurement value $\phi_s(k-N)$ output at the time of k-N so as to obtain a Sagnac phase shift measurement value $\phi_s(k)$ at time k.

Figure 3:
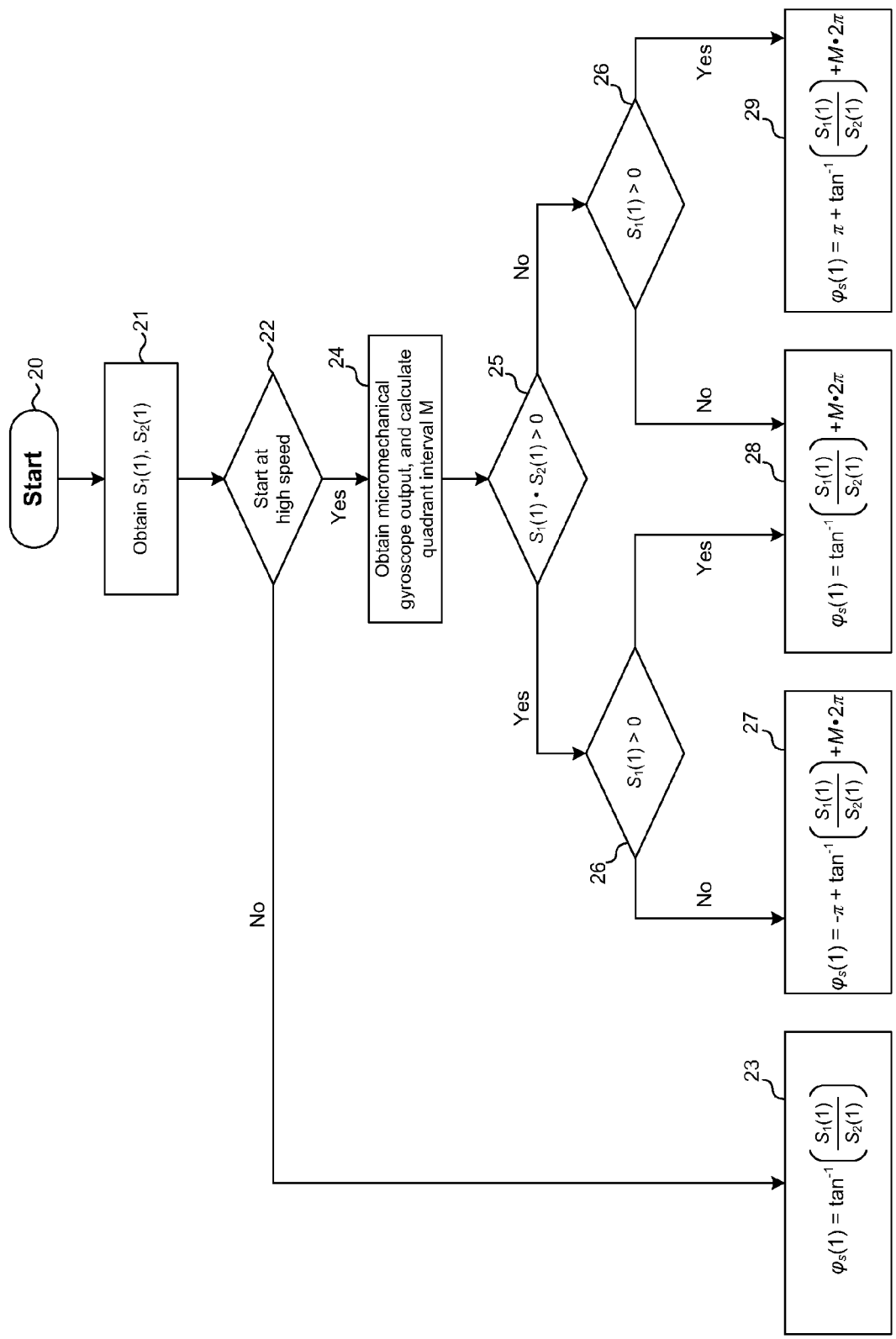
FIG. 3 is a flowchart showing an algorithm which determines a Sagnac phase shift initial value when the fiber-optic gyroscope starts.

Furthermore, a method for determining the initial value of the Sagnac phase shift measurement value is shown as FIG. 3, comprising:

1) obtaining first and second harmonic demodulation signals $S_1(1)$, $S_2(1)$ at the initial time of the fiber-optic gyroscope; judging the start environment of the fiber-optic gyroscope, and if the fiber-optic gyroscope does not start under a high rotation speed, calculating an initial Sagnac phase shift $$\varphi_s(1) = \tan^{-1}\left(\frac{S_1(1)}{S_2(1)}\right);$$

otherwise, skipping to step 2) with the help of a micromechanical gyroscope;

2) obtaining an output angular velocity of the micromechanical gyroscope, and by means of the known single-value interval of the fiber-optic gyroscope, determining a quadrant interval M at which the Sagnac phase shift is placed when the gyroscope starts according to an output value of the micromechanical gyroscope;

$S_1(1)$ 3) multiplying first harmonic demodulation data $S_1(1)$ by second harmonic demodulation data $S_2(1)$, wherein if a result is greater than 0, skipping to step 4), otherwise, skipping to step 5);

4) if the first harmonic $S_1(1)$ is greater than 0, the initial Sagnac phase shift, $$\varphi_s(1) = \tan^{-1}\left(\frac{S_1(1)}{S_2(1)}\right) + M \cdot 2\pi \text{ otherwise,}$$

$$\varphi_s(1) = \pi + \tan^{-1}\left(\frac{S_1(1)}{S_2(1)}\right) + M \cdot 2\pi; \text{ and}$$

5) if the first harmonic $S_1(1)$ is greater than 0, the initial Sagnac phase shift, $$\varphi_s(1) = \pi + \tan^{-1}\left(\frac{S_1(1)}{S_2(1)}\right) + M \cdot 2\pi \text{ otherwise,}$$

$$\varphi_s(1) = \tan^{-1}\left(\frac{S_1(1)}{S_2(1)}\right) + M \cdot 2\pi.$$

Figure 1:
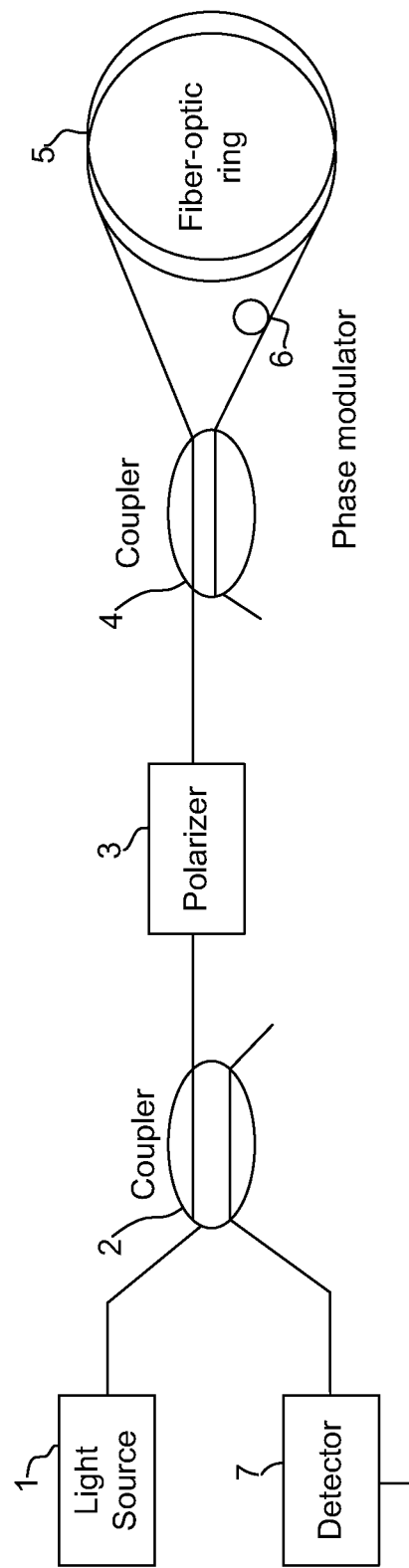
FIG. 1 is a schematic diagram showing a light path part of an open-loop gyroscope.
Figure 2:
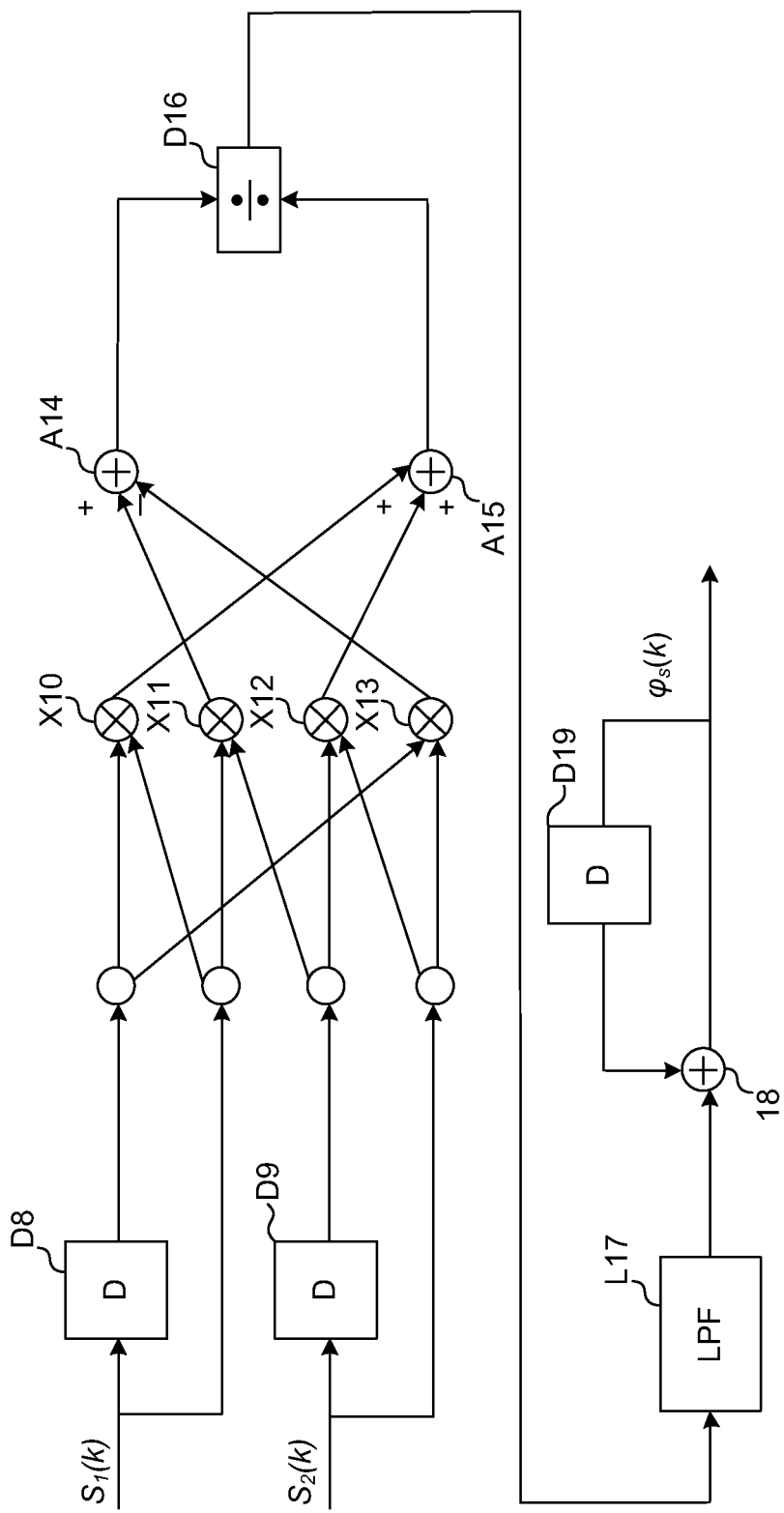
FIG. 2 is a flowchart showing a digital signal processing method which expands the dynamic range of the fiber-optic gyroscope.

A digital signal processing device of a fiber-optic gyroscope is shown as FIG. 2, characterized in that it comprises three delayers D8, D9 and D19, four multipliers X10, X11, X12 and X13, three adders A14, A15 and A18, a low pass filter L17 and a divider D16, wherein one first harmonic demodulation signal $S_1(k)$ of an open-loop fiber-optic gyroscope is respectively connected with input ends of the multipliers X10 and X13 through the delayer D8, and another first harmonic demodulation signal $S_1(k)$ is respectively connected with input ends of the multipliers X10 and X11; one second harmonic demodulation signal $S_2(k)$ of the open-loop fiber-optic gyroscope is respectively connected with input ends of the multipliers X11 and X12 through the delayer D9, and another second harmonic demodulation signal $S_2(k)$ is respectively connected with input ends of the multipliers X12 and X13; an input end of the adder 14 is respectively connected with output ends of the multipliers X11 and X13, and an output end thereof is connected with a dividend input end of the divider; an input end of the adder A15 is respectively connected with output ends of the adder X10 and X12, and an output end thereof is connected with a divisor end of the divider; an output end of the divider is connected with an input end of the adder A18 through the low pass filter; and another input end of the adder A18 is connected with an output end of the delayer D19, and an output end thereof is connected with an input end of the delayer D19.

Furthermore, the delay time of the delayers is N sampling period time, wherein N is a natural number (N=1, 2, 3 . . . ).

Figure 4:
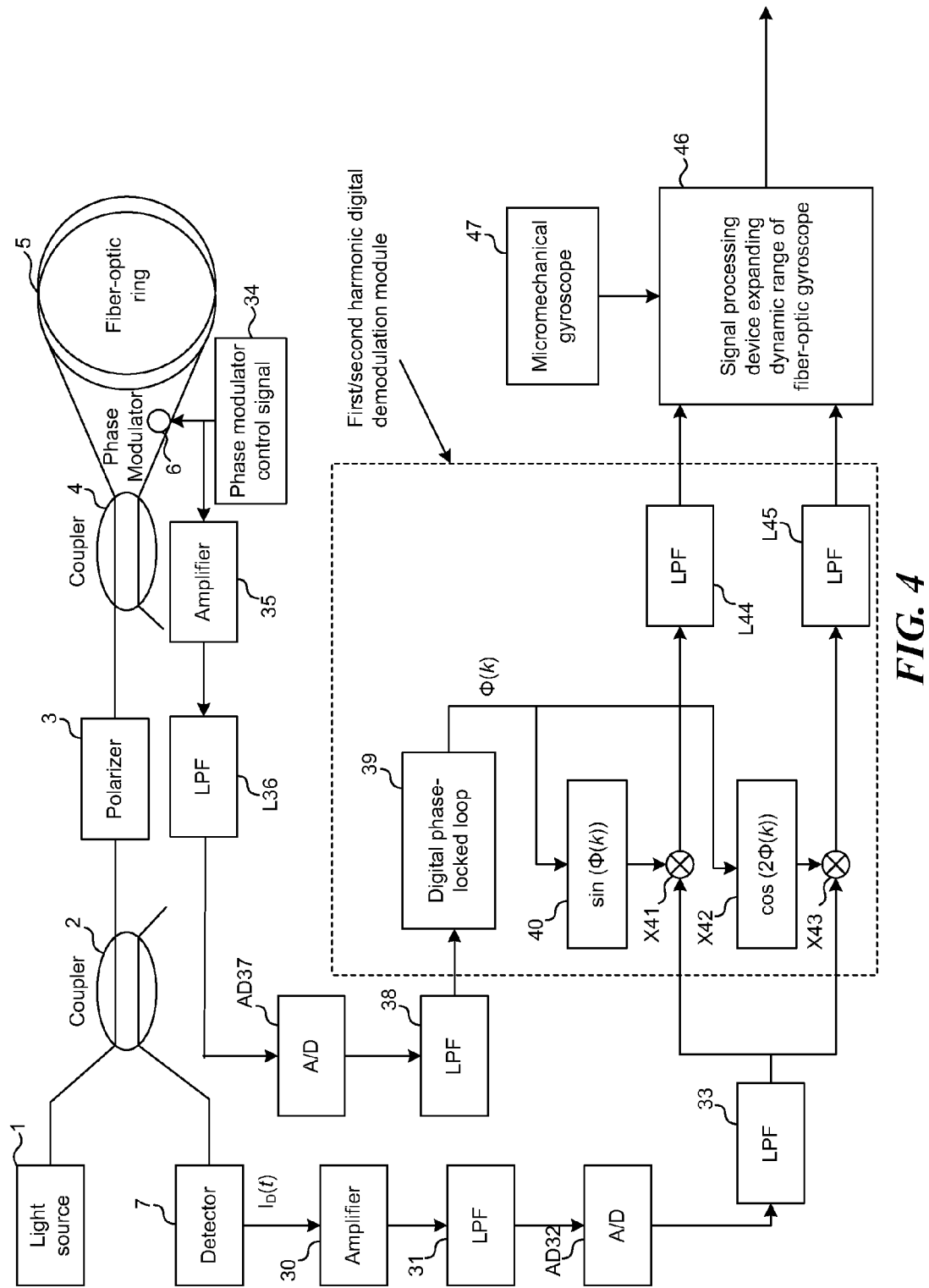
FIG. 4 is a schematic diagram showing the fiber-optic gyroscope based on the digital signal processing method which expands the dynamic range of the fiber-optic gyroscope.

A fiber-optic gyroscope is shown as FIG. 4, characterized in that it comprises an open-loop fiber-optic gyroscope light path structure and a first and second harmonic demodulation unit connected therewith, wherein an input end of the digital signal processing device is connected with an output end of the first and second harmonic demodulation unit and an output end of a micromechanical gyroscope.

Furthermore, the first and second harmonic demodulation unit comprises two sampling modules AD32 and AD37, a digital phase-locked loop, a sine signal generating module 40, a cosine signal generating module 42, two multipliers X41 and X43 and two low pass filters L44 and L45; wherein an output end of a detector in the open-loop fiber-optic gyroscope light path structure is connected with an input end of the sampling module AD32; a signal output end of a phase modulator in the open-loop fiber-optic gyroscope light path structure is connected with an input end of the digital phase-locked loop through the sampling module AD37, and an output end of the digital phase-locked loop is respectively connected with input ends of the sine signal generating module 40 and the cosine signal generating module 42; an input end of the multiplier X41 is respectively connected with an output end of the sine signal generating module 40 and an output end of the sampling module AD32, and an output end thereof is connected with an input end of the low pass filter L44; an input end of the multiplier X43 is respectively connected with an output end of the cosine signal generating module 42 and an output end of the sampling module AD32, and an output end thereof is connected with an input end of the low pass filter L45; and the cosine signal generating module 42 generates a cosine signal of which phase is $2\phi(k)$.

Furthermore, the phase modulator is connected with an input end of the digital phase-locked loop through an amplifier, one low pass filter, the sampling module AD37, and another low pass filter sequentially.

Furthermore, the detector is respectively connected with input ends of the multipliers X41 and X43 through an amplifier, one low pass filter, the sampling module AD32, and another low pass filter sequentially.

The present invention is further explained in detail below with reference to the drawings.

Figure 5:
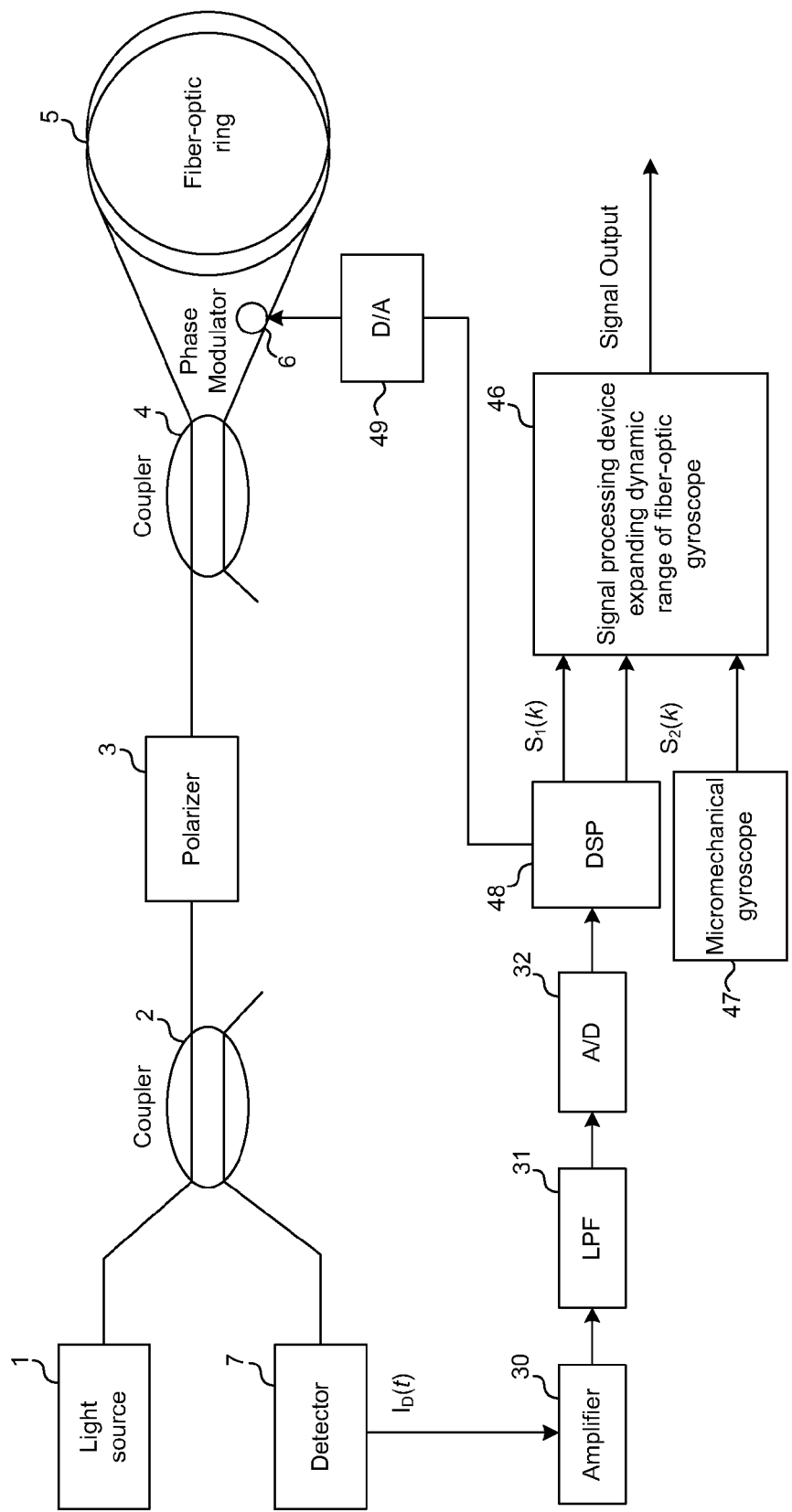
FIG. 5 is application of the digital signal processing device which expands the dynamic range of the fiber-optic gyroscope in the structure of the fiber-optic gyroscope.

FIG. 5 shows a fiber-optic gyroscope in accordance with one embodiment of the present invention. As shown in FIG. 5, the signal processing device which is proposed by the present invention and expands the dynamic range of the fiber-optic gyroscope can be taken as a module to be placed at the back side of a module 48 (digital signal processor) DSP. A DSP processing method performs digital demodulation by the means that an A/D module 32 samples, the DSP module 48 controls and processes, and a D/A module 49 generates a synchronous phase modulator signal to obtain signals $S_1(k)$ and $S_2(k)$. The two signals are then input into the signal processing module 46, i.e., the digital signal processor which expands the dynamic range of the fiber-optic gyroscope, so that the dynamic range of the fiber-optic gyroscope can be greatly expanded.

Figure 6:
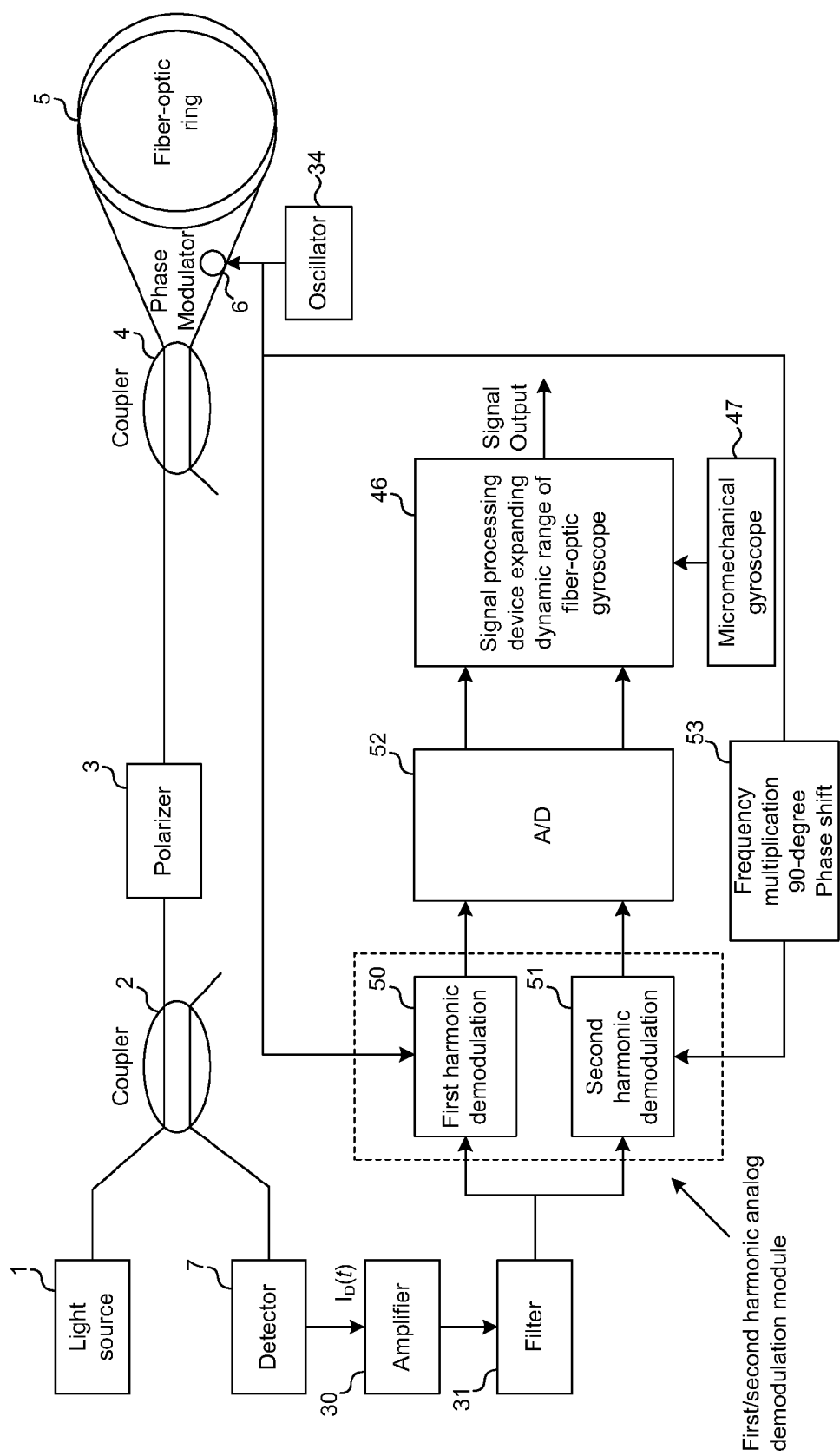
FIG. 6 is application of the digital signal processing device which expands the dynamic range of the fiber-optic gyroscope in the structure of the fiber-optic gyroscope.

In accordance with one embodiment of the present invention, the fiber-optic gyroscope shown in FIG. 6 illustrates another method for performing first and second harmonic demodulation; the solution shown in the FIG. 5 adopts digital demodulation, and the solution shown in FIG. 6 adopts the mode of analog demodulation. In FIG. 6, output of a wave filter module 32 is respectively divided into an input module 50 and a module 51 to perform analog first and second harmonic signal demodulation, and a demodulated reference signal is provided by an oscillator module 34 to guarantee the synchronization, wherein a second harmonic demodulation reference signal can be obtained by performing frequency multiplication and 90-degree phase shift on the first harmonic demodulation reference signal by a module 53. The first harmonic demodulation signal and the second harmonic demodulation signal are input into the module 52 to perform A/D sampling so as to obtain the signals $S_1(k)$ and $S_2(k)$, and are input into the signal processing device 46 which is proposed by the present invention and expands the dynamic range of the fiber-optic gyroscope, so as to finally output the measurement value of the Sagnac phase shift.

It can be seen from the description that any fiber-optic gyroscope which can detect the signal $S_1(k)$ and the signal $S_2(k)$ can use the signal processing device which is proposed by the present invention and can expand the dynamic range of the fiber-optic gyroscope to expand the dynamic range of the fiber-optic gyroscope and restrain the random drift of the scaling factor.

Figure 7:
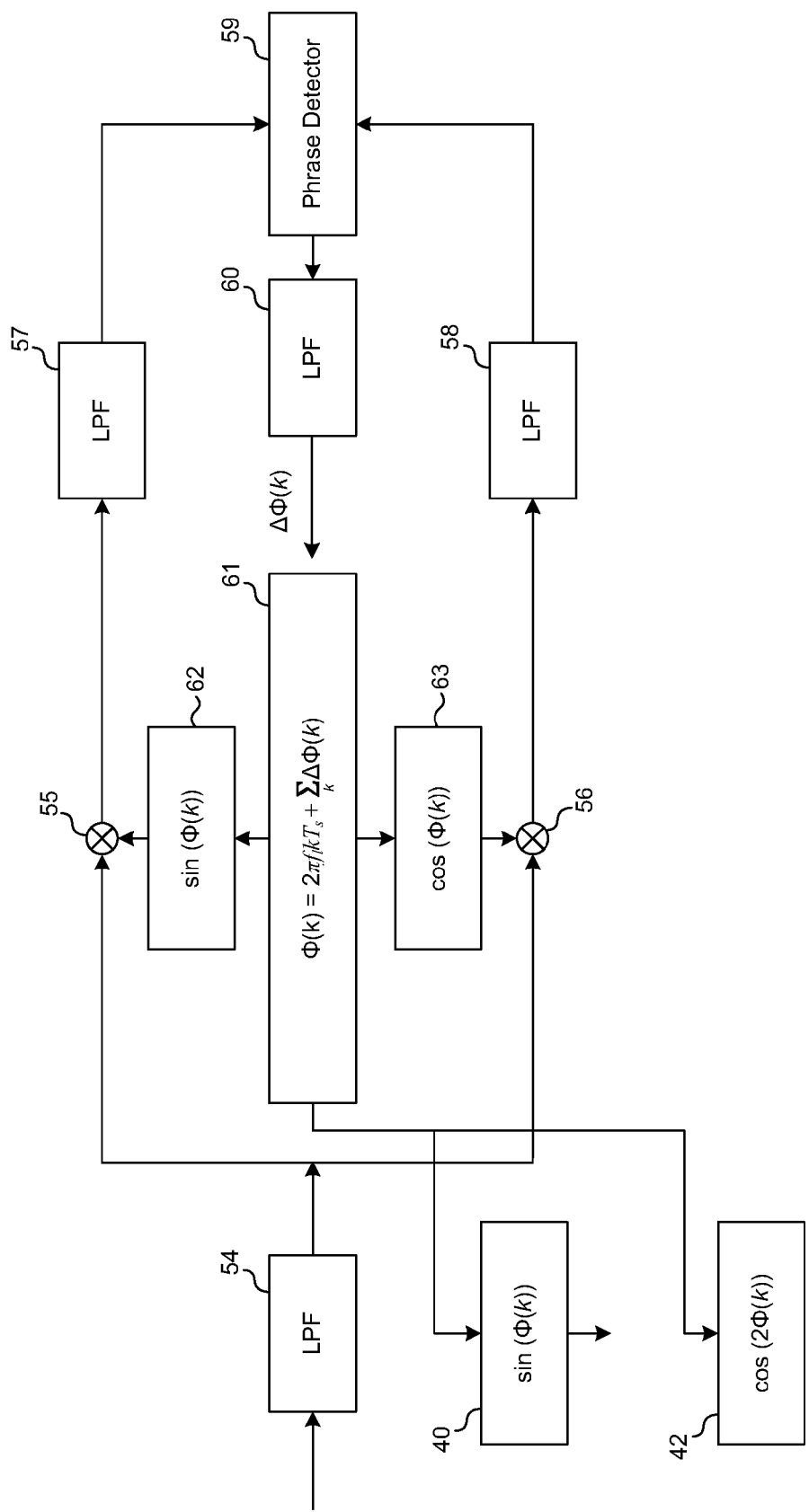
FIG. 7 is an example of an embodiment of a digital lock phase module (a module 39).

The present invention further provides a novel fiber-optic gyroscope using the signal processing device which expands the dynamic range of the fiber-optic gyroscope as shown in FIG. 4. One embodiment of the digital lock phase module in the novel fiber-optic gyroscope is shown in FIG. 7. A signal which is digitally low pass filtered by module 54 is divided into two signals, wherein one signal is multiplied by an output signal of the module 62 by a multiplier shown in the module 55 and is input into a module 59 through a low pass filter shown in a module 57; and another signal is multiplied by an output signal of a module 63 by a multiplier shown in the module 56 and is input into a phase detector shown in the module 59 through a low pass filter shown in a module 58. The module 62 and the module 63 respectively output a sine signal and a cosine signal; the phases of the two signals are as the same as each other; the two signals are all provided by a module 61, and an output signal of the module 61 is $\Phi(k)=2\pi f_1 k T_s + \Sigma_k \Delta\Phi(k)$, k=1, 2, . . . , wherein $f_1$ is a set frequency value which is set to be a phase modulation signal frequency value of the phase modulator, $T_s$ is a reciprocal of an A/D sampling frequency shown in the module 37, and $\Delta\Phi(k)$ is a signal which is obtained by filtering an output signal of the phase detector module 59 by the low pass filter module 60. The module 59 is the phase detector, which is used for detecting the phase difference of two signals output by the module 55 and the module 56 by two signals output by the module 57 and the module 58. The output signal $\Phi(k)$ of each time module 61 is input into a module 40 to generate the sine signal of which the phase is $\Phi(k)$ and is simultaneously input into a module 42 to generate the cosine signal of which the phase is 2Φ(k). The filters shown by the modules 57, 58, and 60 shown in FIG. 7 are used for filtering out harmonic signals except direct current.

The present invention provides a signal processing method and device for the fiber-optic gyroscope, which can effectively expand the dynamic range of the fiber-optic gyroscope, improve the linearity of the scaling factor, and restrain the zero drift of the open-loop fiber-optic gyroscope, i.e., the dynamic fluctuation of the scaling factor. The novel fiber-optic gyroscope proposed by the present invention provides a first harmonic demodulation reference signal and a second harmonic demodulation reference signal, which are high in quality and synchronous in detection signal, to the signal processing device proposed by the present invention by the digital phase-locked loop technology.

The Sagnac phase shift value when the fiber-optic gyroscope starts at a high speed is determined by the output value of the micromechanical gyroscope. By means of the output angular velocity of the micromechanical gyroscope, and according to the angular velocity $\Omega'$ corresponding to the known fiber-optic gyroscope when the Sagnac phase shift is $$\frac{\pi}{2},$$

the corresponding angular velocity interval M at which the Sagnac phase shift is placed when the gyroscope starts at a high speed can be determined. For example, according to FIG. 8, an M value can be determined.

The signal processing method which is proposed by the present invention and expands the dynamic range of the fiber-optic gyroscope is a signal processing method applicable to the back end of the detector and does not require any change of the structure of the open-loop gyroscope or change of the relevant hardware functions so that the open-loop fiber-optic gyroscope using the method can simultaneously have the advantages of the conventional open-loop gyroscope and closed-loop gyroscope, thereby being extremely high in practical value.

What is claimed is:

1. A method comprising:
    generating a plurality of harmonic demodulation signals based on a detection signal of an open-loop fiber-optic gyroscope and a phase modulator signal of the open-loop fiber-optic gyroscope, the plurality of harmonic demodulation signals including a first harmonic demodulation signal and a second harmonic demodulation signal, wherein the first harmonic demodulation signal and the second harmonic demodulation signal are substantially synchronous;
    generating a delayed first harmonic demodulation signal by adding a delay time period to the first harmonic demodulation signal;
    generating a delayed second harmonic demodulation signal by adding the delay time period to the second harmonic demodulation signal;
    generating a first multiplied signal by multiplying the first harmonic demodulation signal and the delayed first harmonic demodulation signal;
    generating a second multiplied signal by multiplying the first harmonic demodulation signal and the delayed second harmonic demodulation signal;
    generating a third multiplied signal by multiplying the second harmonic demodulation signal and the delayed second harmonic demodulation signal;
    generating a fourth multiplied signal by multiplying the second harmonic demodulation signal and the delayed first harmonic demodulation signal;
    generating a first combined signal by subtracting the fourth combined signal from the second combined signal;
    generating a second combined signal by adding the first multiplied signal and the third multiplied signal;
    generating a divided signal by dividing the first combined signal by the second combined signal; and
    generating a Sagnac phase shift measurement value by adding a previous Sagnac phase shift measurement value and the divided signal filtered by a first low pass filter; wherein the time gap between the Sagnac phase shift measurement value and the previous Sagnac phase shift measurement value is substantially equal to the delay time period.

2. The method as recited in claim 1, wherein the method comprises: obtaining an initial value of the Sagnac phase shift measurement value by utilizing the algorithm:
    if the open-loop fiber-optic gyroscope does not start under a high rotation speed, the initial value of the Sagnac phase shift measurement value $$\varphi_s(1) = \tan^{-1}\left(\frac{S_1(1)}{S_2(1)}\right);$$

wherein $S_1(1)$ is the first harmonic demodulation signal; wherein $S_2(1)$ is the second harmonic demodulation signal; otherwise;
    If $S_1(1)*S_2(1)>0$ and $S_1(1)>0$, the initial value of the Sagnac phase shift measurement value $$\varphi_s(1) = \tan^{-1}\left(\frac{S_1(1)}{S_2(1)}\right) + M \cdot 2\pi;$$

If $S_1(1)*S_2(1)>0$ and $S_1(1)\leq 0$, the initial value of the Sagnac phase shift measurement value $$\varphi_s(1) = -\pi + \tan^{-1}\left(\frac{S_1(1)}{S_2(1)}\right) + M \cdot 2\pi;$$

If $S_1(1)*S_2(1)\leq 0$ and $S_1(1)>0$, the initial value of the Sagnac phase shift measurement value $$\varphi_s(1) = \pi + \tan^{-1}\left(\frac{S_1(1)}{S_2(1)}\right) + M \cdot 2\pi; \text{ and}$$

If $S_1(1)*S_2(1)\leq 0$ and $S_1(1)\leq 0$, the initial value of the Sagnac phase shift measurement value $$\varphi_s(1) = \tan^{-1}\left(\frac{S_1(1)}{S_2(1)}\right) + M \cdot 2\pi;$$

wherein M is a quadrant interval at which the Sagnac phase shift is placed when the open-loop fiber-optic gyroscope starts; wherein the quadrant interval M is determined according to an output signal of angular velocity from a micromechanical gyroscope and a single-value interval of the open-loop fiber-optic gyroscope.

3. The method as recited in claim 1, wherein the delay time period is substantially equal to N sampling period time, wherein N is a positive integer.

4. The method as recited in claim 3, wherein the open-loop fiber-optic gyroscope comprises an open-loop fiber-optic gyroscope light path structure, the open-loop fiber-optic gyroscope light path structure including a detector and a phase modulator.

5. A system, comprising:
a harmonic demodulation unit, the harmonic demodulation unit operative to provide a first harmonic demodulation signal and a second harmonic demodulation signal of an open-loop fiber-optic gyroscope; and
a digital signal processing device operative to provide a Sagnac phase shift measurement value, the digital signal processing device comprising:
a plurality of delayers, including a first delayer, a second delayer and a third delayer, each of the plurality of delayers operative to add a delay time period to signals passing through the delayer;
a plurality of multipliers, including a first multiplier, a second multiplier, a third multiplier and a fourth multiplier,
a first adder;
a divider; and
a first low pass filter;
wherein the first multiplier is operative to multiply the first harmonic demodulation signal and a delayed first harmonic demodulation signal passing through the first delayer, and to generate a first multiplied signal;
wherein the second multiplier is operative to multiply the first harmonic demodulation signal and a delayed second harmonic demodulation signal passing through the second delayer, and to generate a second multiplied signal;
wherein the third multiplier is operative to multiply the second harmonic demodulation signal and the delayed second harmonic demodulation signal, and to generate a third multiplied signal;
wherein the fourth multiplier is operative to multiply the second harmonic demodulation signal and the delayed first harmonic demodulation signal, and to generate a fourth multiplied signal;
wherein the divider is operative to divide a first combined signal by a second combined signal and generate a divided signal, the first combined signal obtained by subtracting the fourth multiplied signal from the second multiplied signal, the second combined signal obtained by adding the first multiplied signal and the third multiplied signal;
wherein the first adder is operative to generate the Sagnac phase shift measurement value by adding a previous Sagnac phase shift measurement value and the divided signal filtered by the first low pass filter; wherein the time gap between the Sagnac phase shift measurement value and the previous Sagnac phase shift measurement value is substantially equal to the delay time period.

6. The system as recited in claim 5, wherein the delay time period is substantially equal to N sampling period time, wherein N is a positive integer.

7. The system as recited in claim 6, wherein the digital signal processing device is coupled to the harmonic demodulation unit and a micromechanical gyroscope.

8. The system as recited in claim 7, wherein the system further comprises an open-loop fiber-optic gyroscope light path structure, the open-loop fiber-optic gyroscope light path structure including a detector and a phase modulator.

9. The system as recited in claim 8, wherein the harmonic demodulation unit comprises a first and a second sampling modules, a digital phase-locked loop, a sine signal generating module, a cosine signal generating module, a fifth and a sixth multipliers, and a second and a third low pass filters;
wherein the detector is coupled to the first sampling module;
wherein the phase modulator is coupled to the digital phase-locked loop via the second sampling module;
wherein the digital phase-locked loop is coupled to both the sine signal generating module and the cosine signal generating module;
wherein the fifth multiplier is operative to multiply an output signal of the first sampling module and an output signal of the sine signal generating module, and to generate a fifth multiplied signal;
wherein the second low pass filter is operative to filter the fifth multiplied signal and generate the first harmonic demodulation signal;
wherein the sixth multiplier is operative to multiply the output signal of the first sampling module and an output signal of the cosine signal generation module, and to generate a sixth multiplied signal;
wherein the third low pass filter is operative to filter the sixth multiplied signal and generate the second harmonic demodulation signal.

10. The system as recited in claim 9, wherein the phase modulator is coupled to the digital phase-locked loop via a first amplifier, a fourth low pass filter, the second sampling module and a fifth low pass filter.

11. The system as recited in claim 10, wherein the detector is coupled to the sine signal generating module via a second amplifier, a sixth low pass filter, the first sampling module and a seventh low pass filter; wherein the detector is coupled to the cosine signal generating module via the second amplifier, the sixth low pass, the sixth low pass filter, the first sampling module and the seventh low pass filter.

12. A system, comprising:
a first analog harmonic demodulation unit and a second analog harmonic demodulation unit, the first and second analog harmonic demodulation units operative to provide a first analog harmonic demodulation signal and a second analog harmonic demodulation signal of an open-loop fiber-optic gyroscope;
an analog-to-digital (ND) module operative to receive the first analog harmonic demodulation signal and the second analog harmonic demodulation signal and to generate a first digital harmonic demodulation signal and a second digital harmonic demodulation signal, respectively; and
a digital signal processing device operative to provide a Sagnac phase shift measurement value, the digital signal processing device comprising:
a plurality of delayers, including a first delayer, a second delayer and a third delayer, each of the plurality of delayers operative to add a delay time period to signals passing through the delayer;
a plurality of multipliers, including a first multiplier, a second multiplier, a third multiplier and a fourth multiplier,
a first adder;
a divider; and
a first low pass filter;
wherein the first multiplier is operative to multiply the first digital harmonic demodulation signal and a delayed first digital harmonic demodulation signal passing through the first delayer, and to generate a first digital multiplied signal;

wherein the second multiplier is operative to multiply the first digital harmonic demodulation signal and a delayed second digital harmonic demodulation signal passing through the second delayer, and to generate a second multiplied signal;

wherein the third multiplier is operative to multiply the second digital harmonic demodulation signal and the delayed second digital harmonic demodulation signal, and to generate a third multiplied signal;

wherein the fourth multiplier is operative to multiply the second digital harmonic demodulation signal and the delayed first digital harmonic demodulation signal, and to generate a fourth multiplied signal;

wherein the divider is operative to divide a first combined signal by a second combined signal and generate a divided signal, the first combined signal obtained by subtracting the fourth multiplied signal from the second multiplied signal, the second combined signal obtained by adding the first multiplied signal and the third multiplied signal;

wherein the first adder is operative to generate the Sagnac phase shift measurement value by adding a previous Sagnac phase shift measurement value and the divided signal filtered the first low pass filter; wherein the time gap between the Sagnac phase shift measurement value and the previous Sagnac phase shift measurement value is substantially equal to the delay time period.

13. The system as recited in claim 12, wherein the delay time period is substantially equal to N sampling period time, wherein N is a positive integer.

14. The system as recited in claim 13, wherein the digital signal processing device is coupled to the A/D module and a micromechanical gyroscope.

15. The system as recited in claim 14, wherein the system further comprises an open-loop fiber-optic gyroscope light path structure, the open-loop fiber-optic gyroscope light path structure including a detector and a phase modulator.

16. The system as recited in claim 15, wherein the first and second analog harmonic demodulation unit includes a first harmonic demodulation unit and a second harmonic demodulation unit, the first harmonic demodulation unit coupled to an oscillator and the detector, the second harmonic demodulation unit coupled to the oscillator via a frequency multiplication and 90-degree phase shift unit and the detector;

wherein the first harmonic demodulation unit is operative to provide the first analog harmonic demodulation signal to the A/D module;

wherein the second harmonic demodulation unit is operative to provide the second analog harmonic demodulation signal to the ND module.

17. The system as recited in claim 16, wherein the detector is coupled to the first harmonic demodulation unit via an amplifier and a filter; wherein the detector is coupled to the second harmonic demodulation unit via the amplifier and the filter.

* * * * *